United States Patent [19]

Nakajima et al.

[11] Patent Number: 5,484,343
[45] Date of Patent: Jan. 16, 1996

[54] POWER TRANSMISSION BELT

[75] Inventors: Masayoshi Nakajima, Higashinada; Takashi Kinoshita, Takasago; Arata Hasegawa, Nishi; Yoshiaki Onaka, Hyogo, all of Japan

[73] Assignee: Mitsuboshi Belting Ltd., Nagata, Japan

[21] Appl. No.: 377,205

[22] Filed: Jan. 24, 1995

[30] Foreign Application Priority Data

Apr. 28, 1994 [JP] Japan .................................. 6-114303

[51] Int. Cl.⁶ ...................................................... F16G 1/00
[52] U.S. Cl. ............................. 474/266; 428/96; 474/268
[58] Field of Search ...................................... 474/266–268, 474/260–263; 428/93–96, 239

[56] References Cited

U.S. PATENT DOCUMENTS

| | | | |
|---|---|---|---|
| Re. 31,601 | 6/1984 | Ikeda et al. ........................... | 428/96 X |
| 4,145,468 | 3/1979 | Mizoguchi et al. ..................... | 428/239 |
| 4,146,663 | 3/1979 | Ikeda et al. ........................... | 428/96 |
| 5,230,667 | 7/1993 | Nakajima et al. ..................... | 474/268 X |
| 5,425,681 | 6/1995 | Van Hook ............................ | 474/268 X |

*Primary Examiner*—Michael Powell Buiz
*Attorney, Agent, or Firm*—Wood, Phillips, VanSanten, Clark & Mortimer

[57] ABSTRACT

A power transmission belt having a belt body with a length, an inside, an outside and laterally spaced side surfaces and reinforcing fabric on at least one of the inside and outside of the body. The reinforcing fabric is formed from first yarns including a mixture of polymethaphenylene isophthalamide fibers and polyethylene terephthalate fibers.

20 Claims, 3 Drawing Sheets

POWER TRANSMISSION BELT

BACKGROUND OF THE INVENTION

1. Field of the Invention

This invention relates to power transmission belts and, more particularly, to a power transmission belt having a reinforcing fabric on at least one of the inside and outside surfaces thereof.

2. Background Art

Raw edge power transmission belts are well known in the art. Raw edge belts do not have a covering fabric thereon. Typically, a raw edge belt has load carrying cords embedded in a cushion rubber layer. The cords have high strength and good resistance to elongation. A compression rubber layer, inside of the cushion rubber layer, has short, discrete, reinforcing fibers extending widthwise of the belt. A tension layer is provided outside of the cushion rubber layer. A canvas layer, impregnated with rubber, is provided on the outside of the tension rubber layer and on the inside of the compression rubber layer.

An advantage of this type of belt is that it has a high power transmission capability because it has a higher coefficient of friction than a corresponding belt wrapped with canvas that is impregnated with rubber. At the same time, the covered compression rubber layer is resistant to deformation as it is contacted by a cooperating pulley.

It is known to provide one or more fabric layers on the inside of the compression rubber layer on a raw edge power transmission belt to prevent crack generation thereat. Typically, this reinforcing fabric is made from cotton. It is also known to use polymethaphenylene isophthalamide fibers in the fabric when the belt is to be used in a high temperature environment or under high tension.

Examined Japanese Utility Model Publication No. 37065/1993 discloses a V-belt which is designed to resist abrasion at high temperatures. To accomplish this, a covering fabric is made with a canvas woven using a mixed, spun yarn having cotton fibers and organic fibers, with the latter consisting mainly of polymethaphenylene isophthalamide. This type of belt is commonly used on agricultural equipment.

More severe demands are placed on serpentine belts used on automobile engines than on the belts used in the agricultural environment. These automotive belts are required to transmit large forces at high temperatures without degrading. It is important that crack generation be prevented in this environment.

The raw edge belt is the belt best suited for this environment primarily because of its flexibility, which is attributable in part to the absence of the covering fabric. However, a belt having on its inside and/or outside surfaces thereof multiple canvas layers made of polymethaphenylene isophthalamide tends to slip so that the power transmission capability is compromised.

SUMMARY OF THE INVENTION

The present invention is specifically directed to overcoming the above enumerated problems in a novel and simple manner.

More particularly, the invention has as one of its principal objectives the provision of a belt having a high power transmission capability without compromising resistance to heat degradation and cracking.

More particularly, in one form of the invention, a power transmission belt is provided having a belt body with a length, an inside, an outside and laterally spaced side surfaces and reinforcing fabric on at least one of the inside and outside of the body. The reinforcing fabric is formed from first yarns including a mixture of polymethaphenylene isophthalamide fibers and polyethylene terephthalate fibers.

With the invention, the beneficial properties of each type of fiber can be exploited.

In one form, the polymethaphenylene isophthalamide and polyethylene terephthalate fibers are present in the first yarns in a relative amount of 25–75 wt. % polymethaphenylene isophthalamide.

The first yarns may include twisted second and third yarns, with the second yarn having polymethaphenylene isophthalamide fibers and the third yarn having polyethylene terephthalate fibers, with the polymethaphenylene isophthalamide fibers and polyethylene terephthalate fibers being present in the second and third yarns in a relative amount of 25–75 wt. % of polymethaphenylene isophthalamide.

The first yarns may include twisted second and third yarns, with the second yarn being spun yarn including polymethaphenylene isophthalamide fibers and the third yarn being spun yarn including polyethylene terephthalate fibers, with the polymethaphenylene isophthalamide fibers and polyethylene terephthalate fibers being present in the second and third yarns in a relative amount of 25–75 wt. % of polymethaphenylene isophthalamide.

The second spun yarn can be made up of 5–40 yarns each including polymethaphenylene isophthalamide fibers having a denier of 1.0–4.0 and a length of 20–80 mm.

The third spun yarn can be made up of 5–40 yarns each including polyethylene terephthalate fibers having a denier of 2.0–10.0 and a length of 20–80 mm.

The first yarns may be mixed second and third yarns, with at least one of the second and third yarns being a spun yarn made up of polymethaphenylene isophthalamide and polyethylene terephthalate fibers, with these fibers present in the at least one of the second and third yarns in a relative amount of 25–75 wt. % polymethaphenylene isophthalamide.

The first yarns may be spun or twisted yarns.

The reinforcing fabric may be a woven fabric that is formed by one of plain weaving, twill weaving, and sateen weaving.

The belt body may include a cushion rubber layer with a load carrying cord therein, and a compression rubber layer inside of the cushion rubber layer, with the reinforcing fabric being on the inside of the cushion rubber layer.

In one form, there is no cover fabric applied on either of the laterally spaced side surfaces of the body.

A plurality of reinforcing fabric layers may be provided on one or both of the inside and outside surfaces.

The power transmission belt may be a V-ribbed belt, a V-belt, a toothed belt, or other type of conventional belt.

In another form of the invention, a power transmission belt is provided having a belt body having a length, an inside, an outside, and laterally spaced side surfaces, and a reinforcing fabric on at least one of the inside and outside of the body. The reinforcing fabric may be a woven fabric formed from at least first twisted yarns that are a mixture of polymethaphenylene isophthalamide fibers and polyethylene terephthalate fibers, with the polymethaphenylene isophthalamide fibers and polyethylene terephthalate fibers being present in the first yarns in a relative amount of 25–75 wt. % polymethaphenylene isophthalamide.

The reinforcing fabric may include woven warp and weft yarns, with both of the warp and weft yarns including first yarns as described above.

Alternatively, only one of the warp and weft yarns may include the first yarns, as described above.

The reinforcing fabric may be treated with an RFL solution, after which the fabric can be coated with a rubber composition.

In one form, the RFL solution is formed by mixing an initial polycondensate of resorcinol and formalin with latex.

DETAILED DESCRIPTION OF THE DRAWINGS

Figure 1:
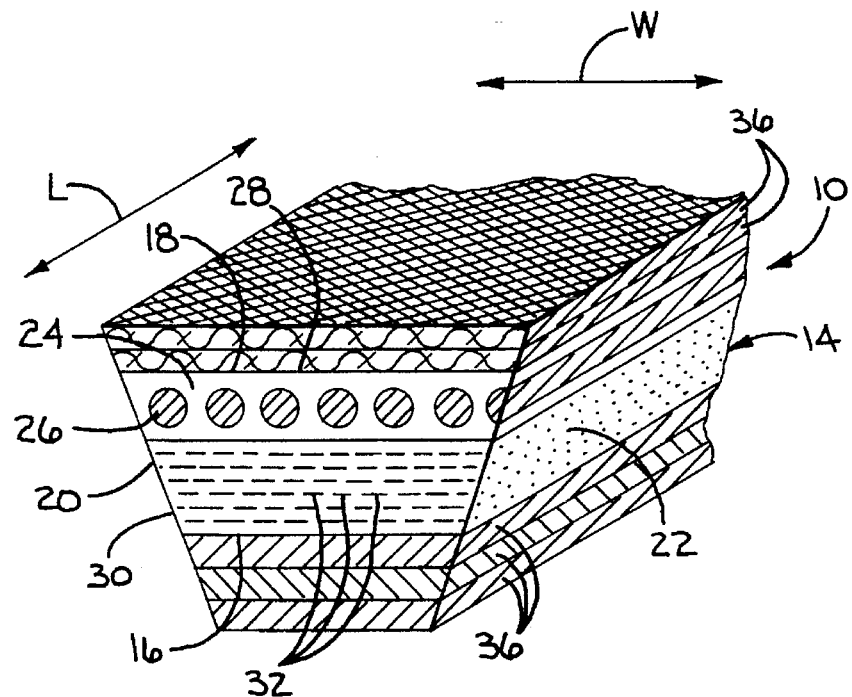
FIG. 1 is a fragmentary, cross-sectional view of a power transmission belt made according to the present invention.

In FIG. 1, one type of power transmission belt, suitable for incorporation of the present invention, is shown at 10. It should be understood that the inventive concept can be practiced with V-ribbed belts, cog belts as shown at 12 in FIG. 2, and other types of conventional belts.

The belt 10 includes a body 14 having a length, in the direction of the double-headed arrow L, and a width, in the direction of the double-headed arrow W. The belt body has an inside 16, an outside 18, and laterally spaced, oppositely facing, pulley-engaging side surfaces 20, 22.

A cushion rubber layer 24 is defined by rubber that is preferably one or a combination of NR, SBR, CR, HNBR. Load carrying cords 26 made from polyester, aramid, or other suitable material, extend lengthwise of the belt 10 and are embedded in the cushion rubber layer 24.

A tension rubber layer 28 is provided outside of the cushion rubber layer 24 and may be made from the same material as the cushion rubber layer 24.

A compression rubber layer 30 is provided on the inside of the cushion rubber layer 24. Short, discrete, laterally extending reinforcing fibers 32 are embedded in the compression rubber layer 30. The fibers 32 may be made from aramid, nylon, polyester, vinyl on, cotton, and the like. Preferably, the fibers 32 are present in the cushion rubber layer 24 in an amount of 5–40 weight parts of fiber 32 per 100 weight parts of rubber.

Figure 2:
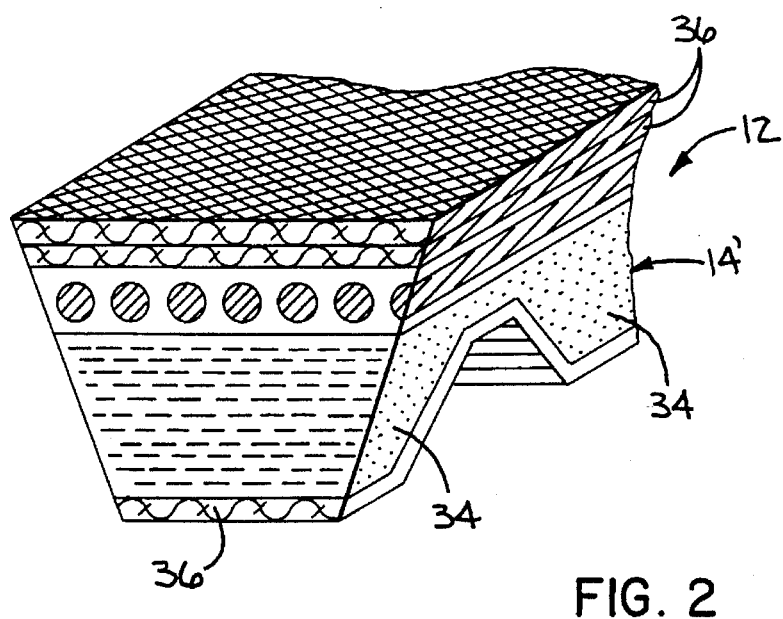
FIG. 2 is a view as in FIG. 1 of a modified form of belt, according to the present invention.
Figure 3:
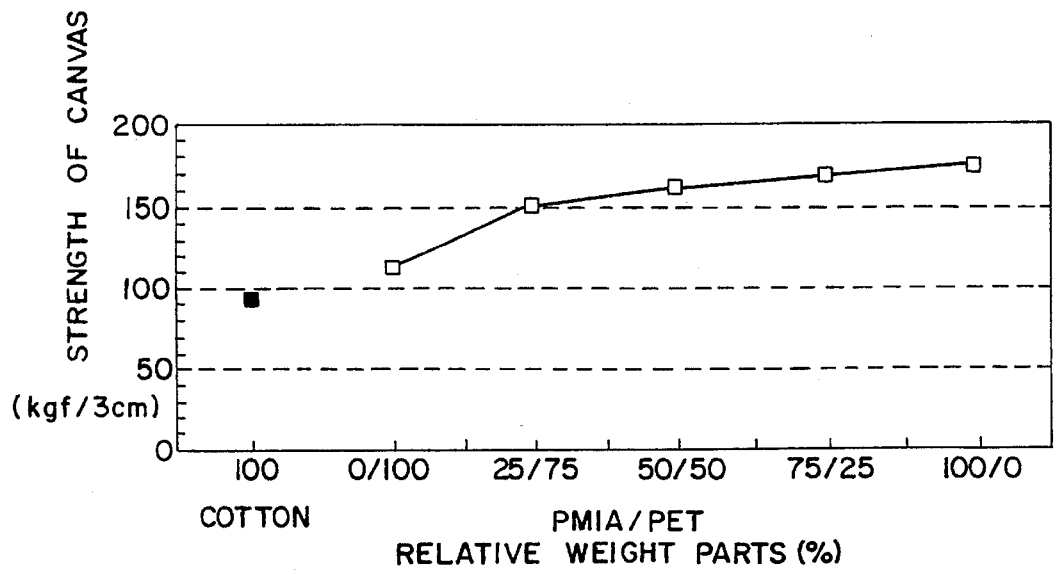
FIG. 3 is a graph showing the relationship between the canvas strength and the relative weight of polymethaphenylene isophthalamide and polyethylene terephthalate for inventive and comparative belt samples.
Figure 4:
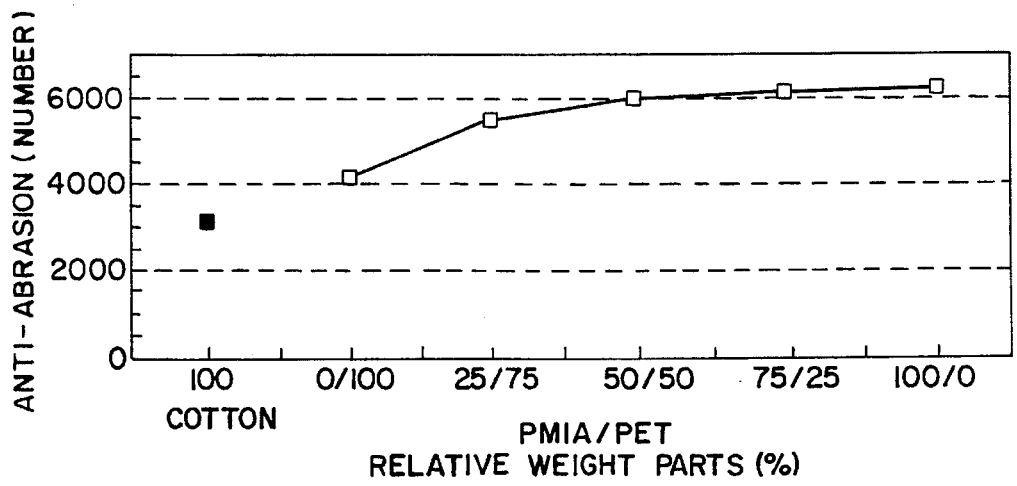
FIG. 4 is a graph showing the relationship between abrasion resistance and the relative weight of polymethaphenylene isophthalamide and polyethylene terephthalate for inventive and comparative belt samples.
Figure 5:
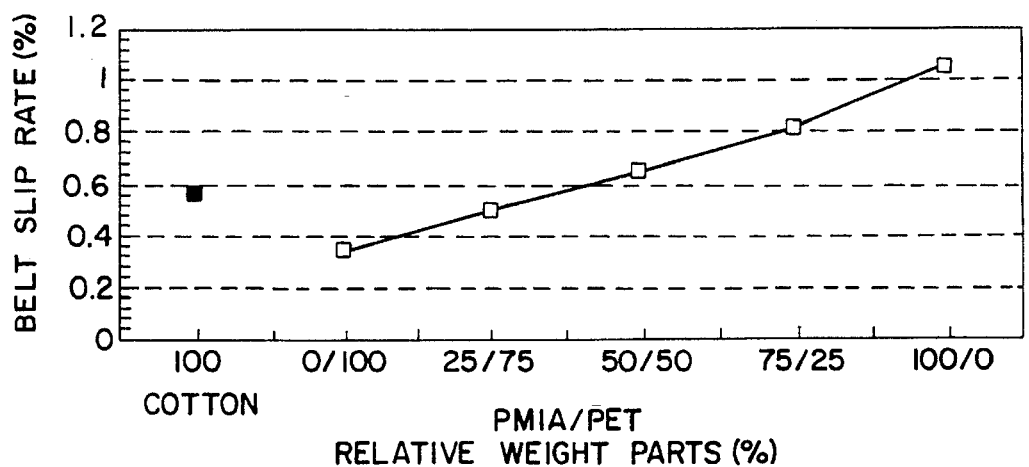
FIG. 5 is a graph showing the relationship between belt slip rate and the relative weight of polymethaphenylene isophthalamide and polyethylene terephthalate for inventive and comparative belt samples.
Figure 6:
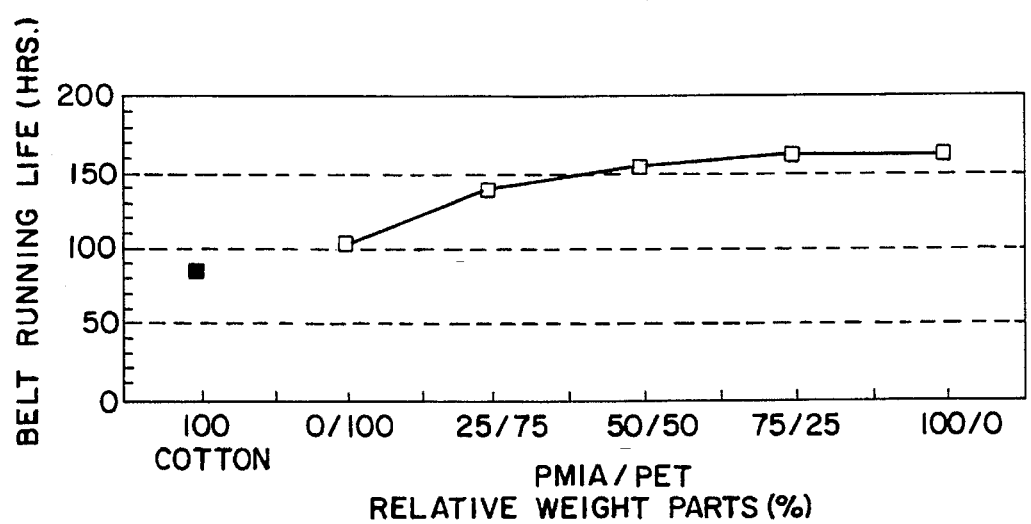
FIG. 6 is a graph showing the relationship between belt running life and the relative weight of polymethaphenylene isophthalamide and polyethylene terephthalate for inventive and comparative belt samples.

The cog belt 12 in FIG. 2 has a similar arrangement of layers defining a belt body 14' and is formed to define regularly longitudinally spaced cogs/teeth 34.

Reinforcing fabric layers 36 are provided on both the inside and outside of the belts 10,12. In the belt 10, three fabric layers 36 are provided on the inside of the body 14, while two such layers 36 are provided on the outside of the body 14. In a preferred form, 1–4 fabric layers 36 are provided on the inside of the belt 10,12, while 1–6 fabric layers 36 are provided on the outside of the belt 10, 12.

The reinforcing fabric may be a canvas with a wide weave angle with warp and weft yarns crossing at an angle in the range of 90°–120°.

The reinforcing fabric 36 is preferably fabric that is woven by one of a plain weave, twill weave or sateen weave process. The fabric layer 36 is made from mixed twisted yarn consisting of a) a spun yarn made up of 5–40 yarns consisting of polymethaphenylene isophthalamide fibers having 1.0–4.0 denier and a length of 20–80 mm and b) a spun yarn made up of 5–40 yarns consisting of polyethylene terephthalate fibers having a denier of 2.0–10.0 and a length of 20–80 min. The polymethaphenylene isophthalamide and polyethylene terephthalate fibers are present in a relative amount of 25– 75 wt. % polymethaphenylene isophthalamide.

The fabric 36 may also be woven by plain weave, twill weave, or sateen weave using a mixed spun yarn of polymethaphenylene isophthalamide fiber having 1.0– 4.0 denier and a length of 20–80 mm and polyethylene terephthalate fiber having a denier of 2.0–10.0 and a length of 20–80 mm, with the polymethaphenylene isophthalamide and polyethylene terephthalate fibers being present in a relative amount of 25–75 wt. % polymethaphenylene isophthalamide.

The mixed spun yarn can be used in the warp alone, the weft alone, or in both the warp and weft.

The polymethaphenylene isophthalamide may be, for example, fibers sold commercially under the trademarks CORNEX™ and NOMEX™.

When the weight percentage of polymethaphenylene isophthalamide is less than 25%, the strength of the canvas, the total running life of the belt, and the abrasion resistance provided by the fabric layer(s) 36 are diminished. If the weight percentage exceeds 75%, there is no significant improvement in terms of canvas strength, belt running life and abrasion resistance, while the slip rate increases.

Polyparaphenylene terephthalamide, which is different from polymethaphenylene isophthalamide, uses multi-filament yarn which bundles filament non-spun yarn. Multi-filament yarn is not suitable for use in the reinforcing fabric layer 36 on the inside of the belt 10, 12 because it limits flexibility.

The reinforcing fabric layer 36 is treated with an RFL solution, and then coated with a rubber composition using a friction coating method to prepare the reinforcing fabric layer 36 for incorporation into the belt 10,12. The RFL solution is prepared by mixing an initial polycondensate of resorcinol and formalin with latex. The latex may be chloroprene, tertiary copolymer of styrene-butadiene-vinylpyridine, hydrogenated nitryl and NBR.

The reinforcing fabric layers(s) 36 on the outside of the belt 10, 12 may be made according to the invention. However, it is not necessary that these outside layers be so made.

With the inventive structure, the characteristics of both polymethaphenylene isophthalamide and polyethylene terephthalate can be exploited.

The effectiveness of the present invention is confirmed through the following testing.

The test belts were constructed as follows.

A non-processed load carrying cord with a total of 6600 denier was formed by twisting polyethylene terephthalate of 1,100 denier with a final twist of 11.4 twists/10 cm and a primary twist of 21.0 twists/10 cm in a reverse twisting direction to form a twist of 2 ×3.

The resulting cord was subjected to a pre-dip treatment by immersing it into isocyanate adhesive consisting of 5 wt. % of polyisocyanate compound (PAPI-135; produced by M. D. Kasei Co.) and 95 wt. % of toluene. The treated cord was dried at a temperature between 180° and 190° C. The cord was then immersed into an RFL solution consisting of 100 weight parts of CR latex, 14.6 weight parts of resorcinol, 9.2 weight parts of formalin, 1.5 weight parts of sodium hydroxide, and 262.5 weight parts of water. The cord was then completed by subjecting it to a drawing thermal fixing operation at approximately 200° to 240° C.

The reinforcing fabric was made using a spun yarn of polymethaphenylene isophthalamide (PMIA) (product sold by Teijin Ltd. under the trademark CORNEX™) and a spun yarn of polyethylene terephthalate, as listed in Table 1, below. These yarns were used to weave the six canvases identified in Table 1.

TABLE 1

|  | Comex/PET | Construction of Canvas |
|---|---|---|
| Comparative Sample 1 | cotton 100% | $^{c}20^{s}/4 \times {}^{c}20^{s}/4$ over $70 \times 70$ |
| Comparative Sample 2 | 0/100 | $^{PET}20^{s}/4 \times {}^{PET}20^{s}/4$ over $70 \times 70$ |
| Sample 1 | 25/75 | $(^{PMIA}20^{s}/1 + {}^{PET}20^{s}/3) \times (^{PMIA}20^{s}/1 + {}^{PET}20^{s}/3)$ over $70 \times 70$ |
| Sample 2 | 50/50 | $(^{PMIA}20^{s}/2 + {}^{PET}20^{s}/2) \times (^{PMIA}20^{s}/2 + {}^{PET}20^{s}/2)$ over $70 \times 70$ |
| Example 3 | 75/25 | $(^{PMIA}20^{s}/3 + {}^{PET}20^{s}/1) \times (^{PMIA}20^{s}/3 + {}^{PET}20^{s}/1)$ over $70 \times 70$ |
| Comparative Sample 3 | 100/0 | $(^{PMIA}20^{s}/4 \times {}^{PMIA}20^{s}/4$ over $70 \times 70$ |

C: Cotton
PET: Polyethylene terephthalate
PMIA: Polymethaphenylene isophthalamide (CORNEX ™ produced by TEIJIN LTD.)

These canvases were then immersed into an RFL solution consisting of 100 weight parts of CR latex, 14.6 weight parts of resorcinol, 9.2 weight parts of formalin, 1.5 weight parts of sodium hydroxide, and 262.5 weight parts of water. The canvases were dried at 150° C. for two minutes to complete preparation of the canvas. Each canvas was subjected to friction coating using a rubber composition as shown at Table 2, below.

TABLE 2

| Friction Rubber Composition | Weight Parts | Coating Rubber Composition | Weight Parts |
|---|---|---|---|
| Chloroprene *1 | 100 | Chloroprene *1 | 100 |
| Carbon Black (SRF) | 50 | Carbon Black (N-550) | 40 |
| Naphthenic oil | 20 | Naphthenic oil | 5 |
| Coumarone oil | 5 | A-C 617 Polyethylene | 5 |
| Brown factice | 5 | Stearic acid | 1 |
| Stearic acid | 1 | MgO | 4 |
| MgO | 4 | Anti-aging agent *2 | 2 |

TABLE 2-continued

| Friction Rubber Composition | Weight Parts | Coating Rubber Composition | Weight Parts |
|---|---|---|---|
| Anti-aging agent *2 | 2 | Zinc oxide | 5 |
| Zinc oxide | 5 | | |
| Total | 192 | Total | 162 |

*1: Chloroprene PM-40 (produced by Denki Kagaku Kogyo Kabushiki Kaisha)
*2: Octyl-Diphenylamine With the rubber composition set out in Table 3, below, and using the method also described below, a) raw edge cog belt with a top width of 22.5 mm, thickness of 10 mm, length of 845 mm, cog depth of 5.0 mm, cog pitch of 10.7 mm and b) raw edge belt having a top width of 8.7 mm, thickness of 6.3 mm and length of 835 mm were fabricated.

The raw edge cog belt had a single ply of canvas impregnated with rubber on the inside of the compression rubber layer. A 3-ply 100% cotton canvas impregnated with rubber was applied on the outside of the tension rubber layer.

The raw edge belt had a 3-ply canvas layer impregnated with rubber on the inside of the compression rubber layer. A 3-ply 100% cotton canvas impregnated with rubber was applied on the outside of the tension rubber layer.

TABLE 3

| Compression Rubber Composition | Weight Parts |
|---|---|
| Chloroprene *1 | 100 |
| Carbon Black (N-55) | 40 |
| Nylon cut fiber | 15 |
| Naphthenic oil | 5 |
| Stearic acid | 1 |
| MgO | 4 |
| Anti-aging agent *2 | 2 |
| Accelerator *3 | 0.5 |
| Zinc oxide | 5 |
| Total | 172.5 |

*1: Chloroprene PM-40 (produced by Denki Kagaku Kogyo Kabushiki Kaisha
*2: Octyl-Diphenylamine
*3: Ethylenethiourea To form the raw edge cog belt, a cog pad having the desired cog shape and the canvas impregnated with rubber on the compression rubber layer were fit into a mold also having the desired cog shape. The load carrying cord, tension rubber layer and cover canvas were successively wound around the mold. The wound shape was then cured to form a belt sleeve. The belt sleeve was then cut to a "V" shape to obtain the individual raw edge cog belts.

The raw edge belt was formed as follows. The canvas impregnated with rubber, the compression rubber layer, a load carrying cord, a tension rubber layer and a cover canvas were wound successively on a mold. The wound layers were cured to form a sleeve which was cut to a "V" shape by a cutter to obtain individual raw edge belts.

The strength of the canvas, the resistance of the canvas to abrasion, the belt slip rate, and the belt running life were determined through testing. The strength of the canvas was determined in accordance with JIS L 1096. The determination of resistance to abrasion was made by curing the canvas in a press, and then by conducting a taper abrasion test conforming to JIS L 1096 to determine the number of abrasion cycles until the belt body protruded through the canvas.

The determination of belt slip rate was determined by training the belt around a tri-pulley system consisting of a drive pulley having a diameter of 125 mm, a driven pulley having a diameter of 125 mm, and a tensioning pulley having a diameter of 70 mm. The system was operated at room temperature, with the drive pulley operated at 4700 rpm. Ten PS of power was applied with a load of 68 kgf for 28 hours. Slip rate (G) is expressed by the equation given below.

$$G = \frac{I_0 - I_{24}}{I_0} \times 100 \quad G: \text{Slip Rate}$$

$$I_0 = \frac{N_{DRO}}{N_{DNO}} \quad \begin{array}{l} N_{DRO}: \text{Drive pulley speed (rpm) at start time} \\ N_{DNO}: \text{Driven pulley speed (rpm) at start time} \end{array}$$

$$I_{24} = \frac{N_{DR24}}{N_{DN24}} \quad \begin{array}{l} N_{DR24}: \text{Drive pulley speed (rpm) after 24 hours} \\ N_{DN24}: \text{Driven pulley speed (rpm) after 24 hours} \end{array}$$

The procedure for determining running life was is as follows. The raw edge cog belt was trained around a drive pulley having a diameter of 115 mm, a driven pulley having a diameter of 100 mm, and a tensioning pulley having a diameter of 50 mm. A load of 10 kgf was applied to the rear face of the belt to give a deflection angle of approximately 160°. The system was operated at 80° C., with the drive pulley operating at 3800 rpm, with 5 PS of applied power. The running time until a crack was generated on the belt cog was determined as the belt life.

The results of the above tests are described below in Table 4.

TABLE 4

| | Comparative Samples | | Example | | | Comparative Samples |
|---|---|---|---|---|---|---|
| | 1 | 2 | 1 | 2 | 3 | 3 |
| PMIA/PET | Cotton 100% | 0/100 | 25/75 | 50/50 | 75/25 | 100/0 |
| Rate of Wt. % of | — | 0 | 25 | 50 | 75 | 100 |
| PMIA | | | | | | |
| Strength of Canvas (kgf/3 cm) | 94 | 114 | 152 | 162 | 169 | 176 |
| Anti-abrasion (number) | 3140 | 4200 | 5600 | 6100 | 6200 | 6300 |
| Belt slip rate (%) | 0.577 | 0.351 | 0.499 | 0.662 | 0.834 | 1.068 |
| Belt running life (hrs) | 89 | 104 | 145 | 157 | 166 | 166 |

As can be seen from Table 4, the inventive belt ran considerably longer than the comparative samples before cracks were generated at the bottom of the cogs on the compression layer. This shows that the inventive belts have excellent durability and resistance to abrasion. Table 4 also shows that the inventive belts had a decreased belt slip rate.

Using the same processed load carrying cord as described above, the reinforcing fabric of Table 5, below, and the rubber composition in Table 3, and using the procedure described above, a) a raw edge cog belt, with a top width of 22.5 mm, thickness of 10 mm, length of 845 mm, cog depth of 5.0 mm, and cog pitch of 10.7 mm and b) a raw edge belt having a top width of 8.7 mm, thickness of 6.3 mm and length of 835 mm were fabricated.

TABLE 5

| | Comex/PET | Construction of Canvas |
|---|---|---|
| Sample 4 | 25/75 | $\dfrac{PMIA/PET20^s/4 \times PMIA/PET20^s/4}{70 \times 70}$ |
| Sample 5 | 50/50 | |
| Sample 6 | 75/25 | |

The strength of the canvas, the resistance to abrasion, the slip rate and the running life were determined in accordance with the same procedures described above. The results are shown in Table 6, below.

TABLE 6

| | Sample | | |
|---|---|---|---|
| | 4 | 5 | 6 |
| PMIA/PET | 25/75 | 50/50 | 75/25 |
| Relative Wt. % | 25 | 50 | 75 |
| Strength of Canvas (kgf/3 cm) | 155 | 166 | 173 |
| Anti-abrasion (number) | 5700 | 6100 | 6250 |
| Belt slip rate (%) | 0.503 | 0.670 | 0.843 |
| Belt running life (hrs) | 147 | 158 | 167 |

As seen in Table 6, the inventive belts ran a significantly longer time until they generated cracks at the bottom of the cogs on the compression rubber layer. This shows that they have excellent durability and resistance to abrasion. The results also show that the inventive belts have a decreased slip rate.

The foregoing disclosure of specific embodiments is intended to be illustrative of the broad concepts comprehended by the invention.

We claim:

1. A power transmission belt comprising:

a belt body having a length, an inside, an outside, and laterally spaced side surfaces; and a reinforcing fabric on at least one of the inside and outside of the body, said reinforcing fabric formed from first yarns comprising a mixture of polymethaphenylene isophthalamide fibers and polyethylene terephthalate fibers.

2. The power transmission belt according to claim 1 wherein the polymethaphenylene isophthalamide and polyethylene terephthalate fibers are present in the first yarns in a relative amount of 25–75 wt. % polymethaphenylene isophthalamide.

3. The power transmission belt according to claim 1 wherein the first yarns comprise twisted second and third yarns with the second yarn comprising polymethaphenylene isophthalamide fibers and the third yarn comprising polyethylene terephthalate fibers and the polymethaphenylene isophthalamide fibers and polyethylene terephthalate fibers are present in the second and third yarns in a relative amount of 25–75 wt. % of polymethaphenylene isophthalamide.

4. The power transmission belt according to claim 1 wherein the first yarns comprise twisted second and third yarns, with the second yarn being spun yarn comprising polymethaphenylene isophthalamide fibers and the third yarn being spun yarn comprising polyethylene terephthalate fibers and the polyethylene terephthalate and polymethaphenylene isophthalamide fibers are present in the second and third yarns in a relative amount of 25–75 wt. % of polymethaphenylene isophthalamide.

5. The power transmission belt according to claim 2 wherein the first yarns comprise spun yarns.

6. The power transmission belt according to claim 1 wherein the reinforcing fabric comprises a woven fabric that is formed by one of plain weaving, twill weaving, and sateen weaving.

7. The power transmission belt according to claim 4 wherein the second yarn comprises 5–40 yarns each comprising polymethaphenylene isophthalamide fibers and having a denier of 1.0–4.0 and a length of 20–80 mm.

8. The power transmission belt according to claim 4 wherein the third yarn comprises 5–40 yarns each comprising polyethylene terephthalate fibers having a denier of 2.0–10.0 and a length of 20–80 mm.

9. The power transmission belt according to claim 1 wherein the first yarns comprise mixed second and third yarns and at least one of the second and third yarns is a spun yarn comprising polymethaphenylene isophthalamide fibers and polyethylene terephthalate fibers with the fibers present in the at least one of the second and third yarns in a relative amount of 25–75 wt. % polymethaphenylene isophthalamide.

10. The power transmission belt according to claim 2 wherein the belt body includes a cushion rubber layer with a load carrying cord therein, there is a compression rubber layer inside of the cushion rubber layer and the reinforcing fabric is on the inside of the cushion rubber layer.

11. The power transmission belt according to claim 10 wherein there is no cover fabric applied on either of the laterally spaced side surfaces of the body.

12. The power transmission belt according to claim 1 wherein there are a plurality of reinforcing fabric layers on the body.

13. The power transmission belt according to claim 1 wherein the power transmission belt comprises one of a V-ribbed belt, a V-belt and a toothed belt.

14. A power transmission belt comprising:

a belt body having a length, an inside, an outside, and laterally spaced side surfaces;

a reinforcing fabric on at least one of the inside and outside of the body, said reinforcing fabric comprising a woven fabric formed from at least first twisted yarns that comprise a mixture of polymethaphenylene isophthalamide fibers and polyethylene terephthalate fibers, said polymethaphenylene isophthalamide and polyethylene terephthalate fibers being present in the first yarns in a relative amount of 25-75 wt. % polymethaphenylene isophthalamide.

15. The power transmission belt according to claim 14 wherein the first yarns comprise twisted second and third yarns, with the second yarn being spun yarns comprising polymethaphenylene isophthalamide fibers and the third yarn being spun yarns comprising polyethylene terephthalate fibers and the polyethylene terephthalate and polymethaphenylene isophthalamide fibers are present in the second and third yarns in a relative amount of 25–75 wt. % of polymethaphenylene isophthalamide.

16. The power transmission belt according to claim 14 wherein the reinforcing fabric includes woven warp and weft yarns and both of the warp and weft yarns comprise the first yarns.

17. The power transmission belt according to claim 14 wherein the reinforcing fabric includes woven warp and weft yarns and only one of the warp and weft yarns comprise the first yarns.

18. The power transmission belt according to claim 14 wherein the reinforcing fabric is treated with an RFL solution.

19. The power transmission belt according to claim 18 wherein the reinforcing fabric is coated with a rubber composition after treatment with the RFL solution.

20. The power transmission belt according to claim 18 wherein the RFL solution is formed by mixing an initial polycondensate of resorcinol and formalin with latex.

* * * * *